(No Model.) 6 Sheets—Sheet 1.
J. FRANKENBERG.
LOCOMOTIVE VALVE GEAR.

No. 543,474. Patented July 30, 1895.

Witnesses
Alfred A. Mathey,
G. W. McCook

Inventor
Julius Frankenberg.
By his Attorneys,
Keller & Stauer

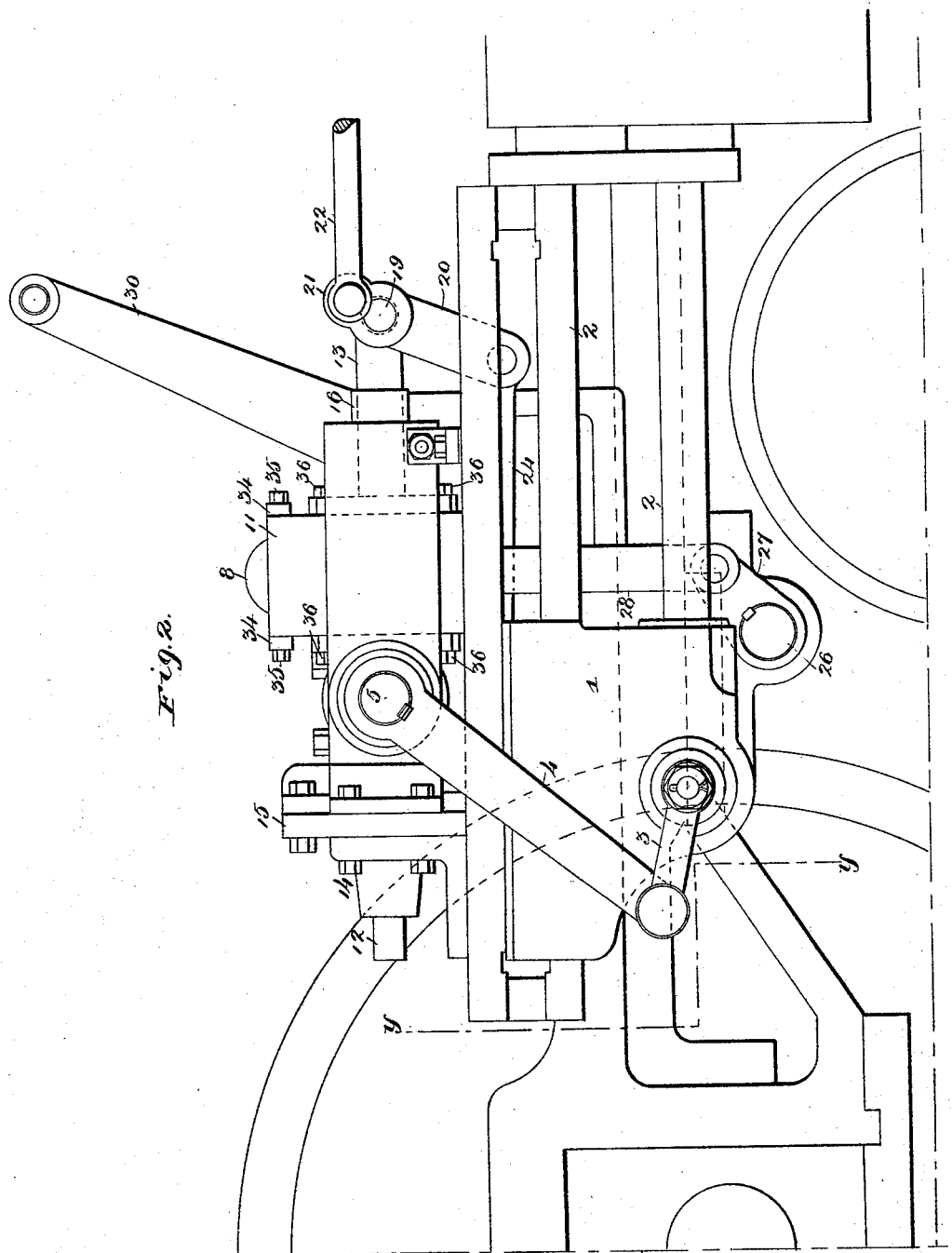

(No Model.) 6 Sheets—Sheet 3.

J. FRANKENBERG.
LOCOMOTIVE VALVE GEAR.

No. 543,474. Patented July 30, 1895.

Witnesses
Alfred A. Mathey.
G. W. McCook

Inventor
Julius Frankenberg.
By his Attorneys,
Keller & Starck

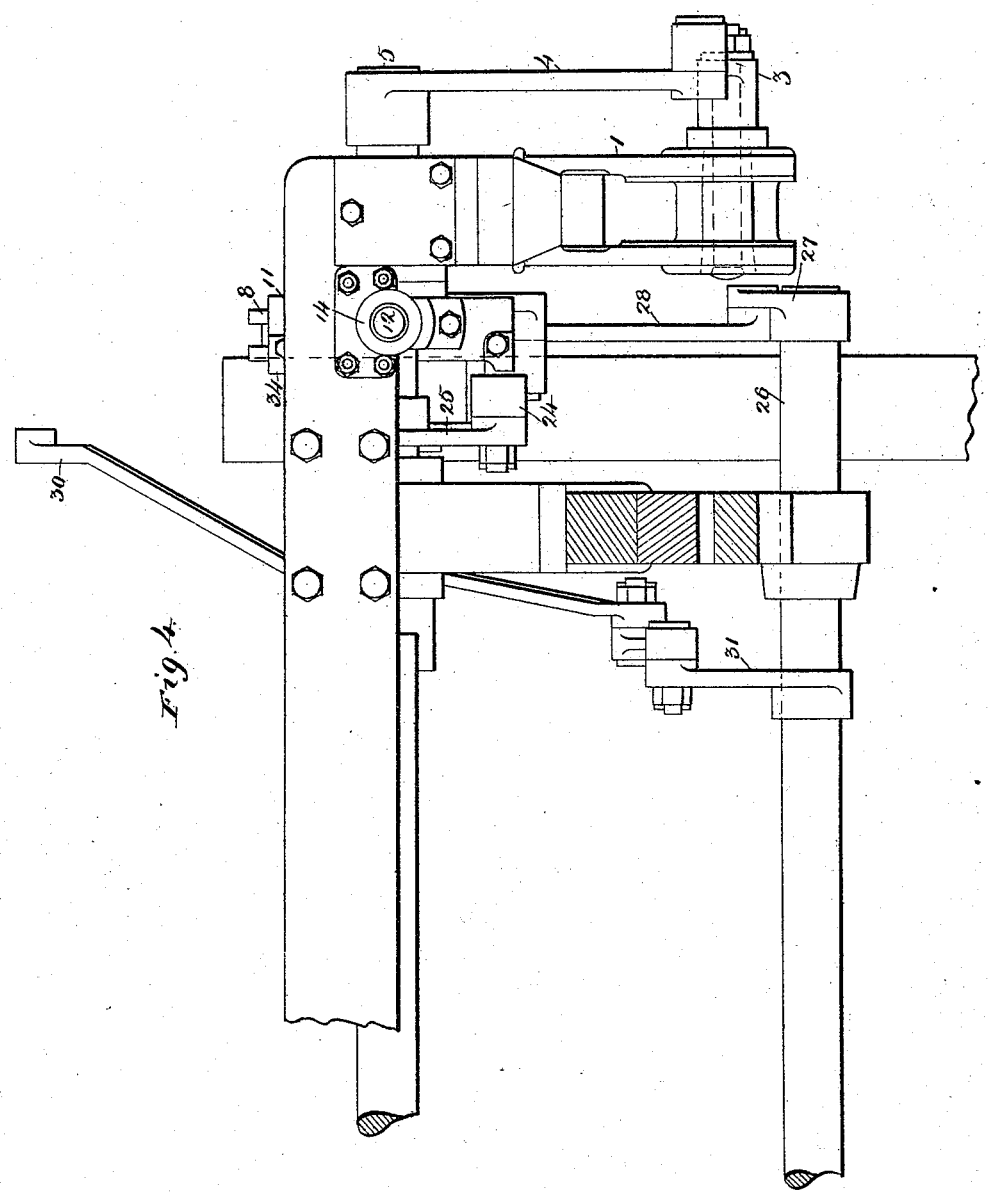

(No Model.)  6 Sheets—Sheet 5.

J. FRANKENBERG.
LOCOMOTIVE VALVE GEAR.

No. 543,474. Patented July 30, 1895.

Witnesses
Inventor
Julius Frankenberg.
By his Attorneys,
Keller & Starek

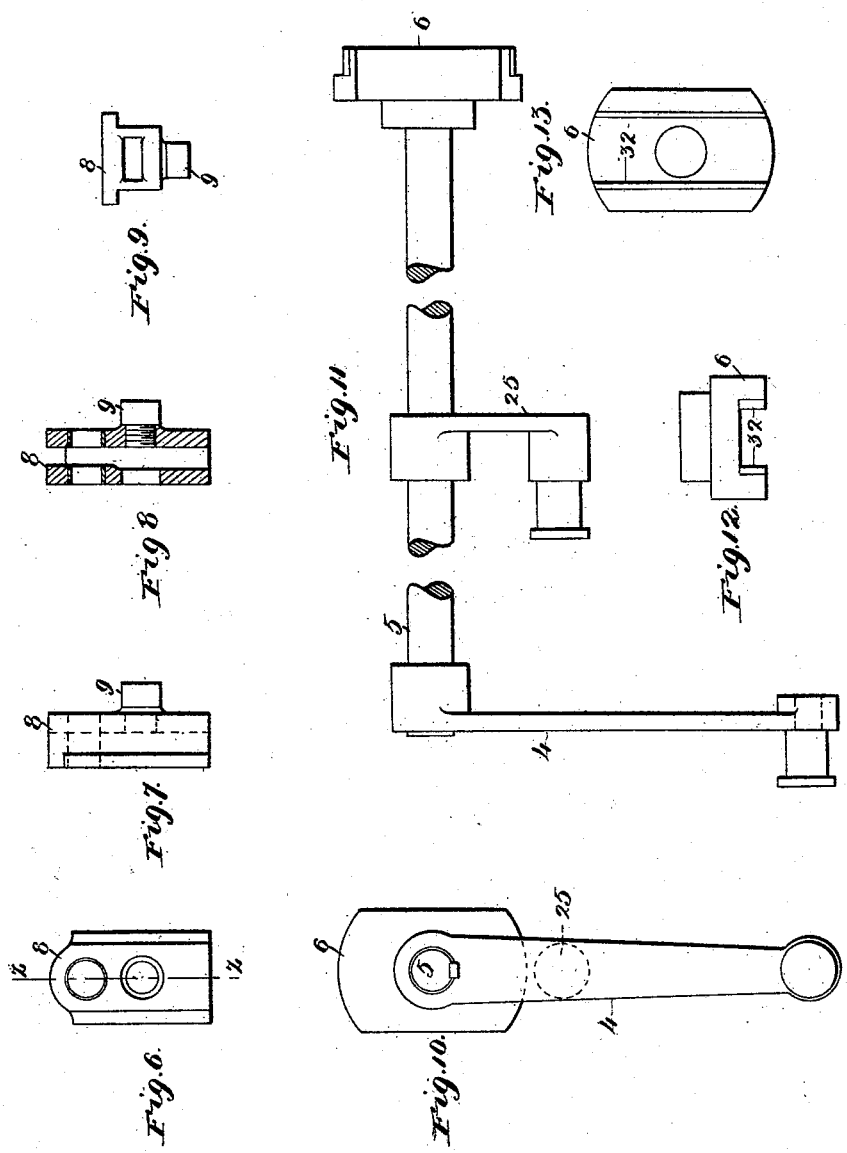

UNITED STATES PATENT OFFICE.

JULIUS FRANKENBERG, OF ST. LOUIS, MISSOURI.

LOCOMOTIVE VALVE-GEAR.

SPECIFICATION forming part of Letters Patent No. 543,474, dated July 30, 1895.

Application filed March 28, 1895. Serial No. 543,468. (No model.)

*To all whom it may concern:*

Be it known that I, JULIUS FRANKENBERG, a citizen of the United States, residing at St. Louis, State of Missouri, have invented certain new and useful Improvements in Locomotive Valve-Gears, of which the following is a full, clear, and exact description, reference being had to the accompanying drawings, forming a part hereof.

My invention has relation to improvements in locomotive valve-gears; and it consists in the novel arrangement and combination of parts more fully set forth in the specification and pointed out in the claims.

Figure 4:
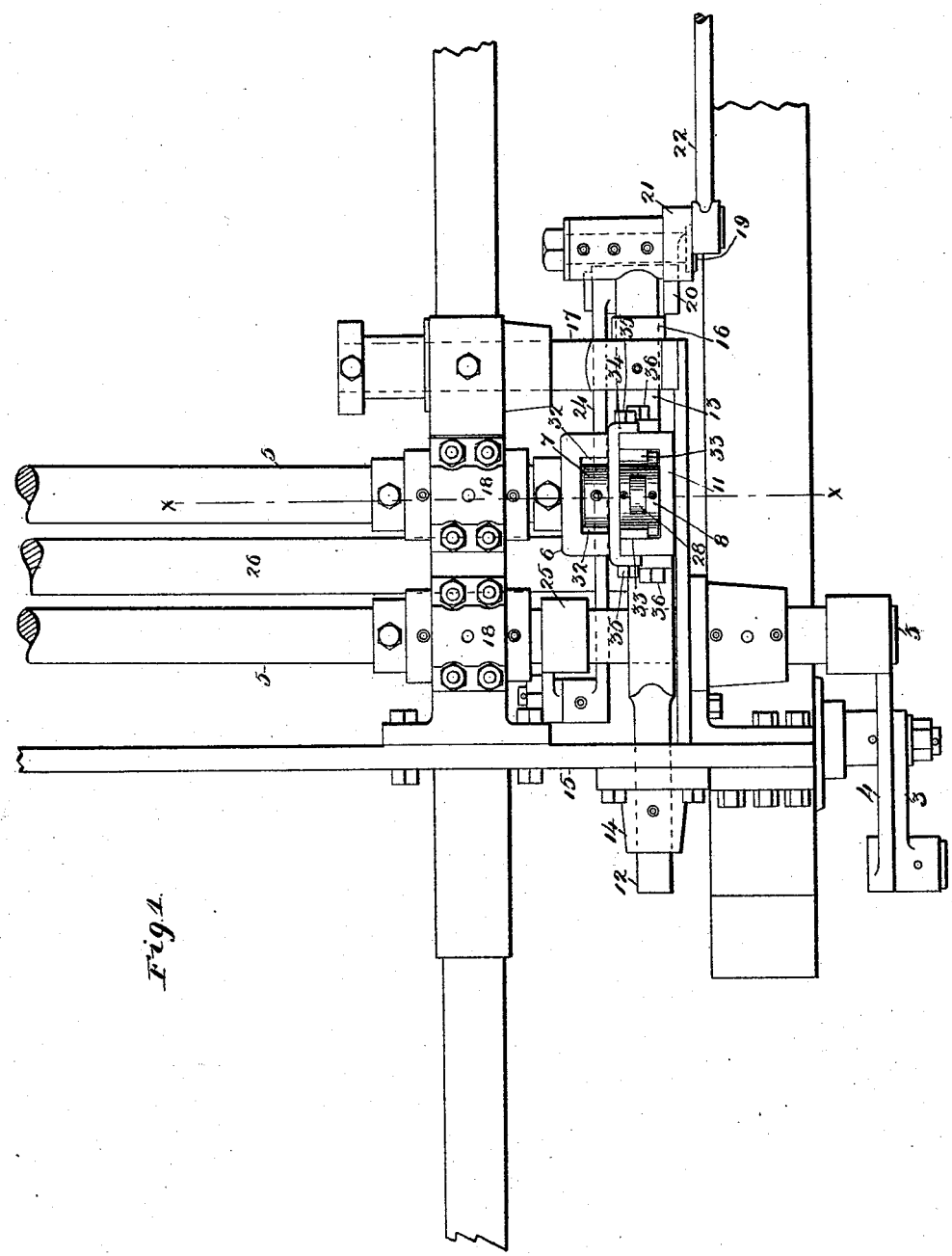
Figure 3:
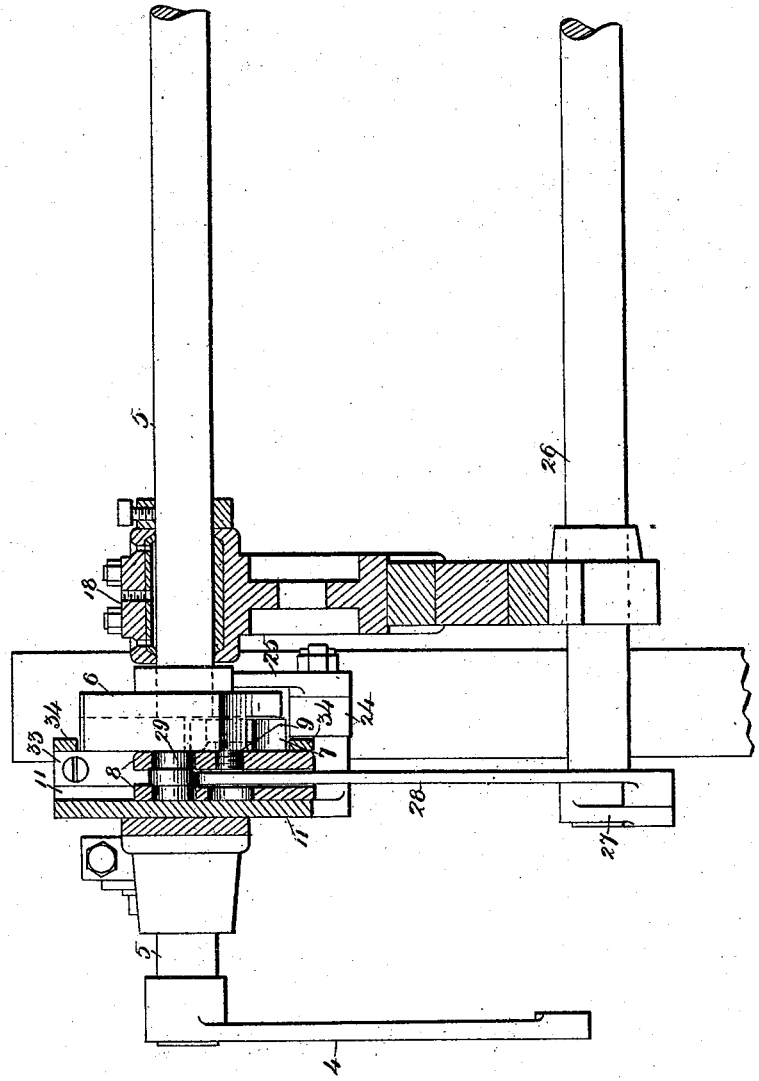
Figure 5:
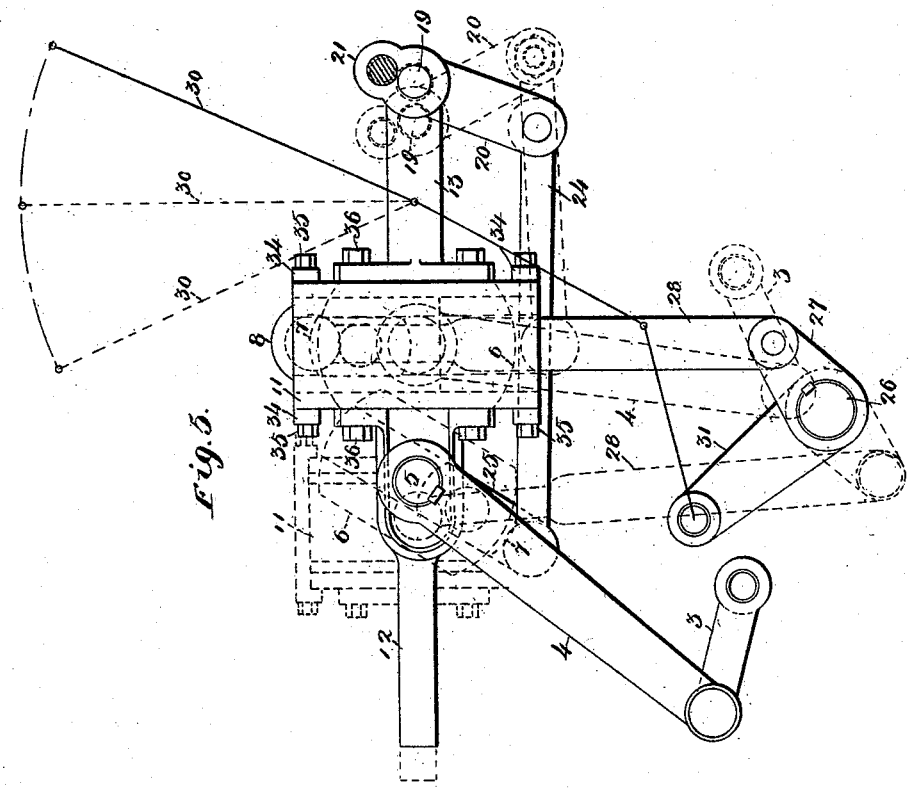

In the drawings, Figure 1 is a plan view of my invention. Fig. 2 is a side elevation thereof. Fig. 3 is a section on $xx$ of Fig. 1. Fig. 4 is a section on $yy$ of Fig. 2. Fig. 5 is a detail in side elevation, showing the relative positions of the reverse-arm, reverse-bar, link-block, and parts co-operating therewith on opposite sides of the locomotive, showing also a diagrammatic view of the connections that control the tumbling-shaft. Fig. 6 is a detail elevation of the reverse-bar. Fig. 7 is a side view of the same. Fig. 8 is a section on $zz$ of Fig. 6. Fig. 9 is a top plan view thereof. Fig. 10 is an end view of one of the rock-shafts, showing the rocking arm and link carried by its respective opposite ends. Fig. 11 is a side view of the same. Fig. 12 is a top plan view of the link carried by one end of the rock-shaft, and Fig. 13 is a side view of the open end thereof.

The present invention is an improvement in the valve-gear described and claimed in my pending application for a like invention, Serial No. 534,458, filed January 10, 1895, and like it has for its object, first, to reduce the number of operating parts to a minimum; second, to reduce to a minimum the number of rock-shafts involved in the transmission of the motion imparted to the slide-valve; third, to effect a constancy of lead under all conditions of travel of the slide-valve; fourth, to make the points of cut-off for both sides of the engine alike, and, fifth, to preserve a constancy of lead under conditions of increased valve travel. It differs from said pending application, however, in that it is simplified as to certain features, particularly those which control the path of the reverse-bar and link-block during an increased throw of the valve, as hereinafter subsequently explained.

In detail the device may be described as follows:

Referring to the drawings, 1 represents a cross-head of ordinary construction, adapted to reciprocate within the guides 2. To the rear end of each cross-head is pivotally secured one end of the cross-head arm 3, the opposite end of which is pivotally connected to the lower end of a long rocking arm 4, which is keyed at its upper end to one end of the rock-shaft 5. Of the rock-shafts 5 there are two in number, the second rock-shaft being correspondingly connected at its opposite end— that is, on the opposite side of the engine—to the cross-head on the other side of the locomotive, as fully shown in Fig. 5. To the end of each rock-shaft opposite to that at which the arm 4 is keyed is secured a straight connecting-link 6, U-shaped in cross-section, which is disposed symmetrically about the axis of the rock-shaft. Within the link— that is, within the straight guideway formed by the lateral walls of the U, is adapted to slide a link-block 7 of suitable length, whose relative positions in the link can be shifted at will by means of the reverse-bar 8, to which it is pivotally secured by means of a pin 9, which enters a suitable opening at the middle of the link-block. The variable vertical positions of the reverse-bar are controlled by the connections between it and the tumbling-shaft, and which will hereinafter be specifically referred to.

In its various positions the reverse-bar is guided by the reverse-bar guide 11, which is secured at right angles to and is carried by the guide-rods 12 and 13, the former guide-rod having a bearing 14 in the guide-yoke 15 and the latter having a bearing 16 in the brace 17, the guide-yoke 15 being secured to the rocker-boxes 18 18 and extending across the engine-frame. The free end of the guide-rod 13 carries a pin 19, about the outer end of which is pivoted the cut-off lever having a long arm 20 and a short arm 21, the free end of the short arm having pivotally secured thereto one end of the valve-rod 22 leading to the slide-valve. (Not shown.) The axes of the guide-rods 12 and 13, the pivotal axis of the cut-off lever, and the axes of the rock-shafts are all in the same plane, which position for the sake of convenience I will denominate the "neutral" line. The lower end of the cut-off lever (arm 20) is pivotally connected to one end of the connecting-rod 24, whose opposite end is pivotally secured to the free end of an arm or lever 25, fixed to the rock-shaft 5.

It is to be understood that the guide-rods 12 and 13, to which the reverse-bar guide 11 is secured, are susceptible of a horizontal rectilinear reciprocating motion within their bearings; and as the reverse-bar is confined within its guide, it will be carried bodily by said reverse-bar guide when reciprocating motion is imparted to the latter.

In my pending application, above referred to, provision is made to confine the reverse-bar and link-block to a reciprocating rectilinear motion for increased throws or travels of the slide-valve. In the present case the construction by which that is accomplished is dispensed with, so that the valve-gear as a whole is much simplified, and although the path of the reverse bar and link-block is not rectilinear for increased throws of the slide-valve, it is, nevertheless, confined to an arc whose curvature is gradual, and though for that reason the present valve is not as mathematically accurate, it is simpler mechanically and at the same time as accurate and true for all practical purposes.

I will now describe the several connections by which the relative positions of the reverse-bar and the link-block within its link are controlled for varying the travels of the slide-valve. Secured to each end of the tumbling-shaft 26, which has its bearings below the rock-shafts, is a fixed arm 27, the two arms extending, however, in diametrically-opposite directions, which must, of course, be the case to move the slide-valves, which are on opposite sides of the engine in proper direction, as will hereinafter more fully appear. The free end of the fixed arm 27 pivotally carries the lower end of the reverse-arm 28, whose upper portion is confined within or passes into the hollow portion of the reverse-bar 8 (the latter being made hollow for the sake of lightness and at the same time admit the swinging or play to which the reverse-arm is subjected) and whose inner end pivotally carries by means of the pin 29 the said reverse-bar. The reverse-bar is therefore pivotally suspended from the inner end of the reverse-arm at a point to one side of the point at which the link-block is pivoted to the reverse-bar. In the present case the point of suspension of the reverse-bar to its arm is above the pivotal point of the link-block—that is to say, it is above the neutral line (above which line it will remain even when the pivotal point of the link-block is depressed below said line in running the engine backward). By this species of connection the length of the reverse-arm is increased to a maximum, the arc described by its free end under conditions of increased valve travel being in proportion comparatively gradual, and the cut-off under all conditions being fully equalized. The tumbling-shaft is operated from the cab of the locomotive by pulling the reverse-lever, (not shown,) which is connected by the reach-rod, (not shown,) to the lever 30, which again, by intermediate connections shown diagrammatically in Fig. 5, connects it to the arm 31 keyed to the tumbling-shaft. It is obvious from these connections that a tripping of the lever 30 in one direction or the other oscillates the tumbling-shaft correspondingly, and so lower or raise the reverse-arm and reverse-bar carried by it (the elevation of these on one side causing a corresponding depression on the other side of the engine). To allow the guide-rod 12 to freely reciprocate during any increased travel of the valve, I bifurcate the inner end thereof, so that it may freely span the rock-shaft, as fully shown in Fig. 5, and not interfere with the latter in its oscillatory movements. The link 6 and reverse-bar guide are each provided with suitable facing-plates 32 and 33, the open end of the reverse-bar being braced by a clamping-strip 34, secured by bolts 35, the reverse-bar guide being itself secured to the guide-rods by bolts 36. The mechanical connections (shown diagrammatically in Fig. 5) being well-known, are not actually illustrated, they being well understood and requiring no detail description.

The operation of the valve-gear will be best understood by a reference particularly to Figs. 1, 2, and 5, it being remembered that the mechanism on one side of the locomotive is duplicated on the other side.

The operation is best explained in connection with the rock-shaft 5 on the right of Figs. 1 and 2—that is to say, the rock-shaft toward the front of the engine. We will start with the position of the parts in midgear, in which position the maximum valve travel is twice the lap and lead, and for which position the lever 30 occupies the middle or vertical position illustrated in Fig. 5. Under these circumstances the reverse-bar 8 and the link-block 7 are held in such a position by the reverse-arm 28 connected to the tumbling-shaft, that the pivotal point of the link-block carried by the reverse-bar is concentric with the axis of its rock-shaft—that is, it is in the plane of the neutral line, and the pivotal point at which the reverse-bar is coupled to the reverse-arm is above the neutral line. As the crosshead is reciprocated, it will, by the intermediate connections of rod 3 and rocking arm 4, impart an oscillatory motion to the rock-shaft on the left, and this latter, by the connections of arm 25, connecting-rod 24, cut-off lever and valve-rod 22, will impart a reciprocating motion to the slide-valve—that is to say, it will be the normal throw of the valve—an amount equal to twice the lap and lead. It may be stated in this connection that the long and short arms of the cut-off lever are so proportioned as to effect this result. With the position of the parts in midgear—that is when the pin carrying the link-block is concentric with the axis of the rock-shaft or on the neutral line, it is apparent that as the right-hand rock-shaft oscillates it will impart only an oscillatory motion to the link-block carried by the link 6, but no motion of any kind will be imparted to the guide-rods 12 and 13, nor to the reverse-bar guide carried by them, nor to the upper end of the cut-off lever which is pivoted at the end of the guide-rod 13. To increase the throw of the valve when, for example, it is desirable to drive the engine forward, the lever 30 is tripped to the right-hand position indicated by full lines in the diagrammatic portion of Fig. 5, under which circumstances the tumbling-shaft and arm 27 will be turned or tripped to the position indicated in full lines in said Fig. 5, (the dotted position showing the relative position of the parts on the other side,) so as to throw the reverse-arm carrying the reverse-bar upward, raising the latter within its guide, and simultaneously raising the link-block within its link. Under these circumstances the pivotal point of the link-block will be shifted above the neutral line and thus be eccentric to the axis of the rock-shaft. With the parts in this position (see Fig. 5) the link-block will no longer remain stationary as before, but will receive a reciprocating motion from the oscillating motion of the rock-shaft. In its reciprocating motion the pivotal point of the link-block will travel along the arc of a circle concentric with the arc of the circle described by that end of the reverse-arm which is pivoted to the reverse-bar, the center of the circle of course being the pivotal connection between the reverse-arm 28 and the arm 27 connected to the tumbling-shaft. On the opposite side of the engine the arc described by the upper end of the reverse-arm will still be above the neutral line, but that described by the pivotal point of the link-block will be below it. Of course with an oscillatory reciprocating motion imparted to the reverse-bar and link-block, the reverse-bar guide, guide-rods 12 and 13, and the upper pivotal point of the cut-off lever will also be reciprocated within the bearings 14 and 16, and thus an increased throw of the valve will be effected, the upper end or short arm of the cut-off lever receiving a reciprocating motion in addition to the oscillatory motion imparted to it by the reciprocation of the cross-head controlling the left-hand rock-shaft, as already explained. To run the engine backward the lever 30 is tripped to the left-hand dotted position indicated in Fig. 5, when the reverse of the operations just described takes place.

It will be noticed that for any increased throw of the valve the motion imparted to the reverse-bar guide and guide-rods will be a reciprocating rectilinear one, and that imparted to the link-block and reverse-bar will be along the arc of a circle, but this arc is gradual owing to the long radius formed by the reverse-arm by reason of its connection to the reverse-bar above the neutral line, which line determines the normal position of the pivotal point of the link-block, that, whether the link-block be shifted above or below the neutral line, the arcs thus described by the pivotal point of the link-block are substantially parallel and a practical equalization of the cut-off is maintained.

The present construction is thus simplified in that the mechanical details shown in my pending application for confining the reverse-bar to a rectilinear reciprocating motion are omitted. In other respects the present construction affords the same advantages, and by the combined co-operation of the link, link-block, and reverse-bar with its guide-rods, a constancy of lead is maintained.

Having described my invention, what I claim is—

1. In a locomotive valve gear, a suitable rock shaft, a cross head, intermediate connections for imparting an oscillatory motion to said shaft, a slide valve in operative connection with said rock shaft and adapted to be reciprocated by the latter, a second rock shaft, a link carried by said second rock shaft having a straight guide-way, a link block movable in said guide-way and adapted to be oscillated by said rock shaft during the normal throw of the valve, a tumbling shaft, a reverse bar for controlling the position of the link block in its guide-way, a reverse-bar guide, and intermediate connections between the tumbling shaft and reverse bar for imparting a rectilinear reciprocating motion to the reverse-bar guide and a simultaneous curvilinear reciprocating motion to the link block and reverse bar for an increased throw of the valve, substantially as set forth.

2. In a locomotive valve gear, two suitable rock shafts, guide rods at opposite ends thereof, suitable bearings for said guide rods, means for reciprocating said guide rods for an increased throw of the valve, a reverse bar guide carried by said rods, and a forked or bifurcated connection between the reverse bar guide and one of the guide rods on either side whereby the said guide rod is made to embrace the rock shaft at one end and permit the free reciprocation of the guide rods, substantially as set forth.

3. In a locomotive valve gear, a suitable rock shaft, a cross head, intermediate mechanism between the cross head and the rock shaft for oscillating the latter, a second rock shaft, a link carried by the same, a movable link block having a pivotal point normally concentric with the axis of oscillation of the second rock shaft, a reverse bar controlling the position of the link block within the link, a reverse bar guide, guide rods secured to the reverse bar guide, a cut-off lever carried at one end of one of said guide rods, a tumbling shaft, suitable bearings for confining the reverse bar guide and guide rods to a rectilinear reciprocating motion for an increased throw of the valve, and a reverse arm between the reverse bar and tumbling shaft for simultaneously confining the reverse bar and link block to a curvilinear motion during such increased valve travel, substantially as set forth.

4. In a locomotive valve gear, a tumbling shaft, a movable reverse bar, a rock shaft, a link carried by said rock shaft at one end thereof, a link block in movable contact with said link pivotally connected to the reverse bar and having its pivotal point normally concentric with the axis of oscillation of the rock shaft, and a positive connection between the tumbling shaft and the reverse bar at a point to one side of the pivotal connection of the link block, substantially as set forth.

5. In a locomotive valve gear, a tumbling shaft, a movable reverse bar, a rock shaft, a link carried by said rock shaft at one end thereof, a link block in movable contact with said link pivotally connected to the reverse bar and having its pivotal point normally concentric with the axis of oscillation of the rock shaft, and a reverse arm interposed between the tumbling shaft and reverse bar and having a pivotal connection with the reverse bar at a point above the neutral line, or the pivotal point of the link block, substantially as set forth.

6. In a locomotive valve gear, a suitable rock shaft, a link carried at one end thereof, a link block in movable contact with said link, a reverse bar to which said link is pivoted, the pivotal point being normally concentric with the axis of the rock shaft, suitable reciprocating guide rods, a reverse bar guide carried by said guide rods and disposed at right angles to the axes of said rods, a reverse arm pivoted to the reverse bar to one side of the pivotal point of the link block, and a tumbling shaft in operative connection with said reverse arm, substantially as set forth.

7. In a locomotive valve gear, a suitable rock shaft, a tumbling shaft, a movable reverse bar, a reverse bar guide, a cut-off lever, suitable guide rods, and intermediate connections between the reverse bar and tumbling shaft for imparting a rectilinear reciprocating motion to the reverse bar guide, guide rods and one end of the cut-off lever, and a simultaneous curvilinear motion to the reverse bar for any increased throw of the valve, substantially as set forth.

8. In a locomotive valve gear, a suitable rock shaft, a straight link of U-shaped cross section at one end thereof, a movable link block operating in said link, a reverse bar to which said link block is pivoted, a cavity in the reverse bar, a reverse arm pivoted to said reverse bar within the cavity at a point above the pivotal point of the link block, a tumbling shaft in operative connection with the reverse arm, a reverse bar guide, and guide rods for the latter, substantially as set forth.

In testimony whereof I affix my signature in presence of two witnesses.

JULIUS FRANKENBERG.

Witnesses:
ALFRED A. MATHEY,
E. STAREK.